Figure 1:
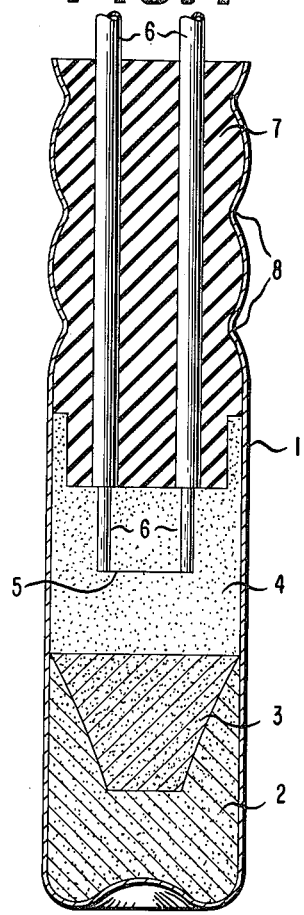

June 14, 1966   R. K. ARMSTRONG   3,256,056
$(Cs_2 B_{10} H_{10})_2 - Cs_2 Cr_2 O_7$ PRODUCT AND PROCESS FOR PREPARING SAME
Filed Dec. 12, 1961

INVENTOR
ROBERT K. ARMSTRONG

BY  *John R. Schmidt*

ATTORNEY

United States Patent Office 3,256,056
Patented June 14, 1966

3,256,056
$(Cs_2B_{10}H_{10})_2 \cdot Cs_2Cr_2O_7$ PRODUCT AND PROCESS FOR PREPARING SAME
Robert K. Armstrong, Glassboro, N.J., assignor to E. I. du Pont de Nemours and Company, Wilmington, Del., a corporation of Delaware
Filed Dec. 12, 1961, Ser. No. 159,203
4 Claims. (Cl. 23—14)

This invention relates to a novel compound which contains boron and to the preparation of this compound. More particularly, the invention relates to a double salt which contains boron, to methods for its preparation and to ignition compositions thereof.

There is a need in the explosives and blasting art for ignition compositions which are reliable and have reproducible ignition properties. One particular area in which this need is particularly acute is in delay initiators and delay connecting devices. Conventional delay-producing compositions now used in the art, because they are normally mixtures of materials, often do not achieve the aforementioned end. In addition, it has been the aim of the art to produce ignition compositions which are insensitive to impact and have excellent resistance to static charges.

The subject invention provides a new boron-containing compound which is eminently suited for use in delay producing compositions, which ignites reliably and uniformly, and which has excellent resistance to impact and static electricity.

The compound of this invention is a double salt of cesium dichromate and cesium decahydrodecaborate having the formula:

$$(Cs_2B_{10}H_{10})_2 \cdot Cs_2Cr_2O_7$$

The compound of this invention is prepared by bringing together, as the sole reactants, a source of decahydrodecaborate, $B_{10}H_{10}^{-2}$, dichromate, and $Cs^+$ in an inert solvent for the reactants.

The decahydrodecaborate can be provided, for example, by decahydrodecaboric acid, its hydronium analog, $[H_3O)_2B_{10}H_{10} \cdot (H_2O)_n$, wherein $n$ is zero or a positive integer] or by salts of decahydrodecaboric acid, such as the amine salts, or metal salts which are soluble in the reaction medium, e.g., the salts of alkali and alkaline-earth metals, copper, lead, silver, etc. Dichromate, $Cr_2O_7^{-2}$, can be provided by, for example, ionizable dichromate salts such as sodium, potassium or ammonium dichromate or by dichromic acid. Any ionizable cesium compound bearing an inert anion can be employed. Examples of such cesium compounds include cesium hydroxide or ionizable cesium salts such as cesium carbonate, cesium fluoride, cesium iodide, cesium bromide, cesium chloride, cesium sulfide or cesium sulfate.

Decahydrodecaboric acid and its hydronium compound can be prepared by treating, at a temperature between 0° C. and 100° C., an aqueous solution of a boron hydride amine salt having the formula 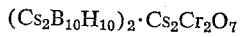 $(R_3NH)_2B_{10}H_{10}$, where R is H or an alkyl radical containing less than 5 carbon atoms, with an ion-exchange resin capable of replacing the amine cations by hydrogen. An example of such an ion-exchange resin is a copolymer of styrene cross-linked with divinylbenzene and sulfonated to introduce sulfonic acid groups into the aryl nucleus as polar groups. The boron-containing acid can be isolated from the aqueous effluent by evaporation of the water at elevated temperatures, e.g., 30–40° C., preferably under reduced pressure (0.1–5 mm. of mercury). A more detailed discussion of the preparation of the acid is disclosed in copending application Serial No. 6,855, filed February 5, 1960, now U.S. Patent 3,148,939, in the name of W. H. Knoth Jr. and assigned to the present assignee.

The boron hydride amine salts can be prepared by reacting two moles of a primary, secondary, or tertiary alkyl amine or of ammonia with 1 mole of a decarboryl bis(alkyl sulfide), e.g., decaboryl bis(dimethyl sulfide) as described in detail in copending application Serial No. 6,854, filed February 5, 1960, now U.S. Patent 3,149,163 and Serial No. 6,853, filed February 5, 1960, now U.S. Patent 3,148,938, in the name of W. H. Knoth, Jr. and assigned to the present assignee. The amine salt also can be prepared by refluxing decaborane with a lower alkyl tertiary amine in benzene for several hours, cooling the mixture, adding acetone, and filtering out the desired amine salt.

The preferred solvent system for use in preparing the double salt is water. The double salt is insoluble in solvents such as lower alcohols, ketones, and the like. However, it is soluble in a more polar solvent such as water or acetic acid. For this reason, a binary solvent system can be used, if desired, so that one component will maintain the unreacted ions in solution while the other component will effect precipitation of the product. Examples of such multi-component solvent systems are water with 95% ethanol, acetic acid with 95% ethanol, water and acetone, water and methanol, and water-acetic acid-acetone mixtures. The amount of solvent used is not critical. The minimum amount of solvent used is that necessary to dissolve all of the reactants. Elevated temperatures may be preferred to increase the rate of dissolution and decrease the amount of solvent necessary for dissolution. There is no upper limit to the amount of solvent which may be used except for economic reasons. Usually reaction mixtures with 60 to 95% solvents are employed.

To obtain maximum yield and utilization of the decahydrodecaborate, at least a stoichiometric amount, and preferably excesses of the dichromate ($Cr_2O_7^{-2}$) and $Cs^+$ are employed. Thus, for two moles of decahydrodecaborate, usually about 1, and preferably 1.5 to 2 moles of dichromate and at least 6, and preferably 6.5 to 7 moles of $Cs^+$ are employed. Generally, greater amounts of dichromate ion, e.g., four moles, are provided when the reaction mixture is basic, e.g., in the case where the amine salts of decahydrodecaboric acid and/or cesium hydroxide or carbonate are used, than when the reaction mixture is acidic or neutral. In a basic reaction mixture, the reduction of $Cr_2O_7^{-2}$ ion to $CrO_4^{-2}$ is encouraged and, hence, the presence of a greater amount of the dichromate initially insures the presence of the $Cr_2O_7^{-2}$ ion. Of course, amounts of $Cs^+$, $B_{10}H_{10}^{-2}$, $Cr_2O_7^{-2}$ ions different from those specified above can be used, however, the yields will inherently be less because the ions will always combine in the proportions required for double salt formation and any unreacted excess $Cs^+$, $B_{10}H_{10}^{-2}$, or $Cr_2O_7^{-2}$ ions present will remain in solution.

The combination of the $Cs^+$, $B_{10}H_{10}^{-2}$, and $Cr_2O_7^{-2}$ ions to form the double salt occurs at room temperature (20–25° C.). However, when the double salt is prepared from the boron hydride amine salt; a dichromate; and a cesium salt, such as carbonate, heating, for example, at temperatures of up to 80° C., and preferably 50 to 70° C., is desirable to drive off volatile compounds such as the free amine, ammonia, and carbon dioxide. The heating serves to effect more efficient recovery of the double salt from the reaction mass and to eliminate tedious separation of the double salt from other compounds which otherwise might be coprecipitated. At temperatures below 0° C. the mobility of the ions lessens and, additionally, recovery of the double salt from the reaction mass is more involved.

The manner of recovering the double salt is not critical and will vary from case to case depending upon the other ions present in solution and the characteristics of the solvent used in its preparation. The double salt is stable at temperatures up to 250° C. and can be isolated from the reaction mass by simple evaporation of the solvent or the double salt can be precipitated from the hot solution by cooling the solution and then filtering. As indicated hereinbefore, multi-component solvent systems in which the reactants are soluble, but the double salt is insoluble can be employed.

As illustrated in the examples, the order of addition of the various ions to the reaction mixture is not critical, e.g., the $B_{10}H_{10}^{-2}$ ion may be contacted initially with either $Cs^+$ ion or $Cr_2O_7^{-2}$ ion and then contacted with the third ion or the $Cs^+$, $B_{10}H_{10}^{-2}$, or $Cr_2O_7^{-2}$ ions all can be added initially.

The following examples illustrate specific embodiments of the invention. Parts and percentages are by weight unless otherwise designated.

*Example 1*

Triethylammonium decahydrodecaborate (3.2 parts, 0.01 mole) and 2.94 parts (0.01 mole) of potassium dichomate were dissolved in 50 parts of water. Five parts of 25% aqueous cesium hydroxide then was added to the solution, and the solution was heated on a steam bath for a period of two hours. Next, about 70% of the water was evaporated from the resulting solution, then the resulting concentrate was cooled; a fine, yellow, needle-like precipitate formed. The precipitate was filtered from the concentrate, and the filter cake was washed with 95% ethanol and then dried.

The infrared absorption spectrum of the yellow crystalline product showed the presence of a band at $4.0\mu$ indicative of the B–H bond, bandes at 9.3, 9.8, and $13.8\mu$ which are indicative of the $B_{10}H_{10}$ nucleus, and bands at 10.5 and $12.0\mu$ which indicate that a true molecular compound, i.e., the double salt of cesium dichromate and cesium decahydrodecaborate, was formed. These bands are not indicative of potassium dichromate or a physical mixture of the reactants. The product was recrystallized three times from water by dissolving the double salt in hot water, cooling the solution to precipitate the double salt, and then separating the double salt by filtration. After each recrystallization, the infrared spectrum of the product was determined. No change occurred in the infrared analysis, i.e., the bands remained the same. The melting point of the product was 260–270° C. (with discoloration) and the product flashed at 290° C.

*Example 2*

Triethylammonium decahydrodecaborate (16.1 parts, 0.05 mole) was dissolved in 60 parts of 25% cesium hydroxide (0.1 mole cesium hydroxide), and the mixture was heated on a steam bath for one and one-half hours. The solution then was filtered, and the filtrate was cooled to near room temperature. To this filtrate was added a second filtrate obtained by (1) dissolving 13.1 parts (0.05 mole) of sodium dichromate in approximately 20 parts of water, (2) adding 16.3 parts (0.05 mole) of cesium carbonate, (3) heating the mixture until dissolution was effected, and (4) filtering the warm solution. The mixture of the combined filtrates then was filtered and cooled. A sample of the resulting precipitate was analyzed as cesium decahydrodecaborate ($Cs_2B_{10}H_{10}$). Additional sodium dichromate (13.1 parts; 0.05 mole) was added to the reaction mixture, then the resulting product was diluted with water and heated at 75° C. until solution resulted. The hot solution was filtered and the filtrate was cooled to precipitate the double salt of cesium dichromate and cesium decahydrodecaborate $$((Cs_2B_{10}H_{10})_2 \cdot Cs_2Cr_2O_7)$$

(34.5 parts) as a precipitate. The product was recrystallized from water to give 22.6 parts of the double salt which melted at about 250° C. (with discoloration) and decomposed at about 280–290° C. Analysis of the above double salt showed:

| | B, percent | Cr, percent | Cs, percent |
|---|---|---|---|
| Calcd. for $B_{20}Cr_2Cs_6H_{20}O_7$ | 17.3 | 8.32 | 63.8 |
| Found | 17.06 | 8.95 | 64.28 |
| | 16.62 | 8.87 | 64.45 |

The infrared spectrum of the product was identical to that of the product of Example 1.

*Example 3*

Cesium decahydrodecaborate (3.84 parts, 0.01 mole) and 2.94 parts (0.01 mole) of potassium dichromate were suspended in 50 parts of water and heated until dissolution resulted. The hot solution was filtered and the filtrate cooled. The infrared spectrum of the product which precipitated out of the solution was identical to that of the product of Example 1.

Figure 2:
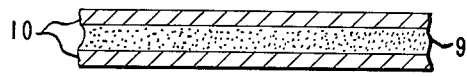

As previously indicated, the double salt of cesium dichromate and cesium decahydrodecaborate has properties which make it useful in explosive applications. Typical of such applications are as an ignition agent in electric initiators and as a slow burning charge in a delay column. For better understanding of the above, reference is now made to the accompanying drawing in which FIGURE 1 represents a conventional electric blasting cap and FIGURE 2 represents a length of delay cord. In FIGURE 1, 1 represents a shell, e.g., of bronze, copper, or aluminum, integrally closed at one end. Adjacent the integrally closed end is a pressed base charge 2, e.g., of any explosive conventionally employed for such purposes, such as cyclotrimethylenetrinitramine (RDX), pentaerythritol tetranitrate (PETN), picric acid, trinitrotoluene (TNT), tetryl or mixtures thereof. Above base charge 2 is primer charge 3 which may be any of the primary explosives (highly sensitive to flame and/or shock) conventionally employed, e.g., lead azide or mercury fulminate. Above primer charge 3 is the loose or pressed igniting charge 4 which in this case consists of the double salt of cesium dichromate and cesium decahydrodecaborate. A bridgewire 5 connecting the terminals of lead wires 6 is embedded within the ignition composition 4. Sealing shell 1 is a plug 7, e.g., of rubber, which also holds the lead wires 6 firmly in position. The plug 7 is held in place by a series of circumferential crimps 8. All of these features, except the novel double salt ignition charge, represent conventional elements of electric initiators.

In FIGURE 2, 9 represents a continuous core of the double salt of cesium dichromate and cesium decahydrodecaborate which is contained within a flexible sheath 10, e.g. of nonmetallic material, such as fiberglass, or a ductile metal, e.g., aluminum, lead, copper, or a braided metal wire.

The use of the double salt of cesium dichromate and cesium decahydrodecaborate in electric initiators and in delay cords is illustrated by the following:

*Example 4*

A series of eight electric blasting caps were assembled as illustrated in FIGURE 1. The bronze shell was 1⅛ inches long with an outer diameter of 0.272 inch and an average inner diameter of 0.26 inch. Into this shell was loaded 5 grains of pentaerythritol tetranitrate pressed at 200 pounds. Immediately above this base charge was loaded 3 grains of lead azide pressed at 200 pounds. In four shells, 3 grains of the double salt of cesium dichromate and cesium decahydrodecaborate pressed at 200 pounds was inserted as the ignition charge, adjacent the primer charge. In the remaining four shells, 2 grains of loose double salt of cesium dichromate and cesium decahydrodecaborate was inserted as the ignition charge, adjacent the primer charge. In each shell was inserted a conventional rubber plug assembly in which the 0.0019 inch diameter bridgewire was soldered to the lead wires separated to provide a ⅛-inch span and projecting ⅛-inch from the base of the rubber plug. The lead wires contained in the rubber plug were of 20-gage copper insulated by nylon. After the cap was loaded and the plug inserted, three peripheral crimps were made in the shell wall to seal the plug. When a 5-ampere direct current was applied to the lead wires, each of the blasting caps detonated. The average time between the application of the current and the detonation of the base charge for the caps with the pressed ignition charge was about 210 milliseconds while that for the caps with the loose ignition charge was about 88 milliseconds. The uniformity in delay within each group of caps was good as compared to conventional delay blasting caps.

*Example 5*

A lead tube filled with the double salt of cesium dichromate and cesium decahydrodecaborate was drawn down through a series of dies to give a cord having an outer diameter of 0.125 inch and a double salt distribution of 19.56 grains per foot of length. A 6-inch length of the thus-prepared cord, ignited by an electric blasting cap, burned for a period of 13.6 seconds.

The above procedure was followed for preparing a cord drawn down to an outer diameter of 0.15 inch and having a double salt distribution of 26.4 grains per foot of length. A six-inch length of the thus-prepared cord, ignited by an electric blasting cap burned for a period of 18.2 seconds.

Cords having a double salt distribution of from 15 grains per foot of length to as high as 250 grains per foot of length may similarly be prepared according to the above procedure.

The use of the double salt of cesium dichromate and cesium decahydrodecaborate in delay initiators and delay connecting devices provides distinct advantages over well-known standard delay-producing compositions, e.g., boron-red lead mixtures, barium peroxide, selenium mixtures, antimony-potassium permanganate mixtures, and black powder. For example, the double salt burns at a more uniform rate and exhibits a more reproducible burning rate than do the standard delay compositions. These advantages are believed to be attributed to the fact that the double salt of cesium dichromate and cesium decahydrodecaborate is a single molecule; whereas, the standard delay compositions are generally physical mixtures of two or more components and, if not mixed properly, give unpredictable and unreliable results.

The double salt is relatively insensitive to impact and exhibits excellent resistance to static charges. In the impact sensitivity test, the double salt on a steel plate does not detonate when a ½-inch diameter steel ball is dropped on the double salt from a height of up to 45 inches.

In the test for static resistance, the lead wires of a cap containing the double salt were twisted together and connected to the high voltage terminal of "leg-to-shell" static sensitivity apparatus consisting essentially of a source of variable voltage and a series of micromicrofarad condensers ranging in capacitance from 250–2000μμf.; the shell of the cap was connected to a ground line. Voltages from 0 to 30,000 volts were applied to a condenser of known capacitance in increments of 1,000 volts and the condenser was allowed to discharge through the cap. The cap did not detonate at the upper limit of the machine, e.g., at voltages of 30,000 volts applied through a 2,000μμf. condenser, indicating that the double salt has a static resistance greater than 77,500 man-equivalent volts (mev.). Despite the insensitivity to impact and static, the double salt of cesium dichromate and cesium decahydrodecaborate is easily ignited by a heated wire, making the salt highly desirable as an ignition compound in blasting devices.

Not only does the double salt of cesium dichromate and cesium decahydrodecaborate have properties desirable in explosive applications, but also the double salt is light sensitive, i.e., turns brown, and can be used in applications where such a characteristic is desirable.

The invention has been fully described in the foregoing discussion; however, it will be apparent to those skilled in the art that many variations are possible without departure from the scope of the invention. It is intended, therefore, to be limited only by the following claims.

I claim:

1. A double salt of the formula $$(Cs_2B_{10}H_{10})_2 \cdot Cs_2Cr_2O_7$$

2. A process for preparing $(Cs_2B_{10}H_{10})_2 \cdot Cs_2Cr_2O_7$, which comprises bringing together, as the sole reactants, (a) a compound of the group consisting of decahydrodecaboric acid, its hydronium analog, and an ionizable salt of said acid, (b) an ionizable $Cr_2O_7^{-2}$ salt and (c) an ionizable cesium compound, in an inert solvent for such reactants at a temperature of 0 to 250° C.

3. A process of claim 2 wherein the solvent comprises water.

4. A process of claim 2 wherein reactant (a) is triethylammonium decahydrodecaborate.

References Cited by the Examiner

UNITED STATES PATENTS

| 2,410,801 | 11/1946 | Audrieth | 149—22 X |
| 2,988,438 | 6/1961 | Allovio | 149—22 X |
| 2,993,751 | 7/1961 | Edwards et al. | 23—14 |
| 3,033,644 | 5/1962 | Ager | 23—14 |
| 3,107,613 | 10/1963 | Armstrong et al. | 23—14 |
| 3,126,305 | 3/1964 | Armstrong | 149—22 X |

OTHER REFERENCES

Lipscomb: "Boron Hydrides," 1963, page 160.

Lipscomb: "Proceedings of the National Academy of Sciences," volume 47, No. 11, pages 1796–1797 (November 1961).

BENJAMIN HENKIN, *Primary Examiner.*

MAURICE A. BRINDISI, *Examiner.*

M. WEISSMAN, *Assistant Examiner.*